United States Patent [19]

Tamura et al.

[11] Patent Number: 5,182,799
[45] Date of Patent: Jan. 26, 1993

[54] RETRIEVING DATA USING HASH MEMORY ADDRESS GENERATED BY REVERSING /XOR BITS OF SELECTED BIT STRINGS OF AN INPUT PACKET ID

[75] Inventors: Toshiyuki Tamura; Masaki Fujita; Shinji Komori; Hisakazu Sato; Hidehiro Takata, all of Itami, Japan

[73] Assignee: Mitsubishi Denki Kabushiki Kaisha, Tokyo, Japan

[21] Appl. No.: 416,887

[22] Filed: Oct. 4, 1989

[30] Foreign Application Priority Data

Apr. 21, 1989 [JP] Japan ................... 1-102712

[51] Int. Cl.[5] .......................................... G06F 12/02
[52] U.S. Cl. ........................ 395/400; 364/DIG. 2; 364/241.8; 364/255.1; 364/947.2; 364/947.7; 364/963; 370/94.1
[58] Field of Search ... 364/200 MS File, 900 MS File; 395/400, 425; 370/94.1

[56] References Cited

U.S. PATENT DOCUMENTS

| | | | |
|---|---|---|---|
| 4,152,762 | 5/1979 | Bird et al. | 364/200 |
| 4,153,932 | 5/1979 | Dennis et al. | 364/200 |
| 4,591,979 | 5/1986 | Iwashita | 364/200 |
| 4,860,191 | 8/1989 | Nomura et al. | 364/200 |
| 4,901,229 | 2/1990 | Tashiro et al. | 364/200 |
| 4,922,438 | 5/1990 | Ballweg | 370/85.15 |
| 4,943,916 | 7/1990 | Asano et al. | 364/200 |
| 4,965,715 | 10/1990 | Yoshida | 364/200 |
| 4,967,391 | 10/1990 | Iijima | 364/900 |
| 5,072,377 | 12/1991 | Asai et al. | 395/400 |

OTHER PUBLICATIONS

"Report of research and development in Oki Electric Co., Ltd.", pp. 19-26 and FIGS. 2-6.
Hiraki et al., "A Challange for New Generation Super Computer Systems", Journal of Information Processing, vol. 10, No. 4, 1987, pp. 219-226.
Sowa et al., "A data flow computer Architecture with Program and Token Memories"; IEEE Trans on Computers; vol. C31, No. 9, Sep. 1982.

*Primary Examiner*—Thomas C. Lee
*Assistant Examiner*—Krisna Lim
*Attorney, Agent, or Firm*—Townsend and Townsend

[57] ABSTRACT

A data retrieving apparatus having an address generator for selecting partly at least one of bit strings of the identification data and generating a hashed address by a reversible operation thereof when a packet having an operand data and a plurality of identification data is inputted, a hash memory for being accessed by the hashed address, a match detector for comparing the identification data of the stored packet with the identification data of the inputted packet and judging match/mismatch thereof when a valid packet is already stored in the hashed address generated from the inputted packet, an associative memory unit for storing the identification data of the inputted packet as a retrieval data when the match detector judges to be mismatch, and judging match/mismatch of the identification data already stored with the identification data of the inputted packet when a packet is inputted, and an output selector for selecting an output from the hash memory or the associative memory unit in response to the result of judgement of said associative memory unit.

16 Claims, 11 Drawing Sheets

Fig. 11

| | PB | EQ | HIT | FC | FL | W/R̄·H | W/R̄·C | S/R̄ | C1 | WRF | OPERATION CONTENTS |
|---|---|---|---|---|---|---|---|---|---|---|---|
| (1) | 1 | — | — | 0 | 0 | 0 | 0 | 0 | 1 | 0 | THROUGH OUTPUT OF INPUTTED PACKET |
| (2) | 1 | 1 | 0 | 1 | 0 | 1 | 0 | 0 | 1 | 0 | FIRE WITH THE DATA STORED IN HASH MEMORY, RESET THE PRESENCE BIT CORRESPONDING TO THE FIRED DATA |
| (3) | 1 | 0 | 0 | 1 | 0 | 0 | 1 | 1 | 0 | 0 | CAUSE HASHED ADDRESS CONFLICT. STORE INPUTTED PACKET IN CAM |
| (4) | 1 | 0 | 1 | 1 | 0 | 0 | 1 | 0 | 1 | 0 | CAUSE HASHED ADDRESS CONFLICT. FIRE WITH THE DATA STORED IN CAM, RESET THE PRESENCE BIT CORRESPONDING TO THE FIRED DATA |
| (5) | 0 | — | 0 | 1 | 0 | 1 | 0 | 1 | 0 | 0 | VALID DATA NOT STORED, STORE INPUTTED PACKET IN HASH MEMORY |
| (6) | 0 | — | 1 | 1 | 0 | 0 | 1 | 0 | 1 | 0 | FIRE WITH THE DATA STORED IN CAM, RESET THE PRESENCE BIT CORRESPONDING TO THE FIRED DATA |
| (7) | 1 | 0 | 0 | 1 | 1 | 0 | 0 | 0 | 1 | 1 | CAUSE HASHED ADDRESS CONFLICT. CAM FULLY OCCUPIED |

RETRIEVING DATA USING HASH MEMORY ADDRESS GENERATED BY REVERSING /XOR BITS OF SELECTED BIT STRINGS OF AN INPUT PACKET ID

BACKGROUND OF THE INVENTION

1. Field of the Invention

The present invention relates to an apparatus for retrieving data which had been stored with hashing process, and specifically relates to a data retrieving apparatus used for a data-driven processor which generates a pair of data wherein identification data match with each other and performs "fire" processing.

2. Description of Related Art

FIG. 1 is a conceptual view of processing of a data-driven processor, which shows an aspect of addition of two data. In FIG. 1, when a packet 81 having a value "A" and an annexed identifier "a" is given to a matching memory 87, an identifier field comparator 84 retrieves whether or not a packet having an identifier matching with the identifier "a" of the packet 81 is stored in a waiting memory 85. In FIG. 1, a packet 82 having a value "B" and the identifier "a" is stored, and therefore this packet 82 is read out from the waiting memory 85 and is sent to a data pair forming unit 86 together with the inputted packet 81.

The data pair forming packet 86 combines the packet 81 and the packet 82, and forms data 83 wherein the identifier "a" is added to the value "A" and the value "B" (this is referred to as fire), and arithmetic operation is executed in a data processing unit 88.

In an example in FIG. 1, the packet 82 having the same identifier "a" as that of the packet 81 inputted to the waiting memory 85 is kept stored, but when a packet having the same identifier as that of the packet 81 inputted to the waiting memory 85 is not stored, the inputted packet 81 is stored in the waiting memory 85, and is made to wait until a packet having the identifier matching with this is inputted.

Thus the matching memory has a role of retrieving a packet to be operated in the data-driven processor.

In the normal data-driven processor, the bit width of identifier is several dozens of bits, and therefore if addresses of memory are assigned for each identifier, the memory capacity becomes enormous. Therefore, conventionally a memory, wherein the bit width is compressed (hereinafter referred to as hash) as a memory used for the matching memory, is used as a memory address (hereinafter referred to as hash memory).

FIG. 2 is a bit map showing a configuration of one example of an inputted packet, and FIG. 3 is a block diagram showing a configuration of one example of a hash memory.

An inputted packet comprises a 18-bit operand data OD to be operated, a seven-bit operation code OC which is a code showing the content of operation, a one-bit processor select bit PS, a one-bit FC processing select bit showing whether the inputted packet is a two-input instruction or a one-input instruction, and a left/right data select bit showing arrangement to left or right responding to the sequence of operation, and is constituted with a total of 62 bits further comprising a selection code SC performing various selections, a nine-bit color/generation identification number DN showing the attribute such as input sequence of the inputted data and 21-bit node number NN showing a location where operation is to be performed. Then, a 31-bit identifier which is an identification code is constituted with the processor select bit PS, the color/generation identification number DN and the node number NN.

A hash memory 601 is such that a total of nine bits consisting of lowest three bits of the color/generation identification number DN and lowest six bits of the node number NN are accessed as a hashed address, and a read/write signal W/$\overline{R}$·H determining a read/write cycle and a set/reset signal S/$\overline{R}$ renewing write-in data and a presence bit PB showing "valid" or "invalid" of each address are given thereto.

The write-in data to be stored consists of a total of 40 bits of 18 bits of operand data, 21 bits of identifier (6 bits of color/generation number DN and 15 bits of node number NN) and one bit of processor select bit PS. Also, in the hash memory 601, the one-bit presence bit PB is stored additionally, and one word consists of a total of 41 bits. Also, an address space is $2^9 = 512$, and the hash memory 601 has a capacity of 41 bits/word $\times 512$.

Where the hash memory is used, a crash at the same address, so-called hashed address conflict might occur when the hashed address (hereinafter referred to as hashed address) is accessed.

In other words, the hashed address conflict is caused because, even if a part of the identifier is set as a hashed address and the hashed address matches with data already stored in the hash memory, when the data whose remaining identifier does not match is accessed, the address for storing that data has been already occupied.

As a prior art for avoiding this hashed address conflict, the data-driven processor disclosed on P.19–P.26 in "Report of research and development in Oki Electric Co., Ltd." and the invention (U.S. Pat. No. 5,072,377, issued on Dec. 10, 1991 ) by the present applicant are publicly known. See U.S. Pat. No. 5,072,377 filed Nov. 17, 1987.

The former installs a chain field showing correlation of addresses in the hash memory, and retrieves data to become a pair by sequentially referring the addresses shown in the chain field in the hash memory if a hashed address conflict occurs.

The latter installs a tag comparator comparing the value of identifier, and when a hashed address conflict occurs, compares the value of the identifier of the inputted data with that of the identifier of the read out data, and stores the data having a smaller-value identifier in the hash memory, and the data having a larger-value identifier is added a through flag, and is circulated in the apparatus without being processed until it can be stored in the hash memory, finally being inputted to the hash memory. This value of the identifier is determined according to the processing sequence of a program, and therefore value comparison of the identifiers is performed and the data having the identifier of smaller value is stored in the hash memory, and thereby a generation of an infinite loop caused by a dependent relation of data in executing the program is prevented.

However, the former sequentially retrieves data to become a pair by tracing the addresses specified by the chain field when a hashed address conflict occurs, and therefore there is a problem that, when frequency of occurrence of hashed address conflict increases, the processing time per data is extended, and the processing efficiency of the whole processor is remarkably reduced.

Accordingly, the capacity of the hash memory is required to be increased to reduce the frequency of occurrence of hashed address conflict, and the use of the hash memory for reducing the memory capacity becomes meaningless.

Also, the latter compares the value of the identifier of data, and replaces data in the hash memory, and therefore the mechanism becomes complicated. Also, data wherein the through flag is set circulates in the processor, and occupies the processor during that time, and therefore the processing efficiency of the processor is reduced.

On the other hand, the hashed address, as described above, for example, is generated by connecting three bits from nine-bit color/generation identification number DN and six bits from 21-bit node number NN of the identifier. And the address space of the hash memory of $2^9$ is divided into color/generation sections of $2^3 (=8)$, and one color/generation section has $2^6 (=64)$ address spaces. Accordingly, when the lowest three bits of the color/generation identification number DN of the inputted data are equal, they access to the same color/generation section, and when the color/generation sections are small in number, the frequency of access to the address spaces of one section $(=2^6)$ increases, resulting in an increase in frequency of hashed address conflict. This means that, if the lowest three bits of the color/generation identification number DN of the inputted data are equal, despite that it has as many as $2^9 (=512)$ address spaces, virtually a eighth $(=64)$ of $2^9$ spaces thereof are accessed. Therefore, the frequency of hashed address conflict sometimes increases by eight times.

SUMMARY OF THE INVENTION

The present invention has been achieved to solve the problems as mentioned above, and an object of the present invention is to provide a data retrieving apparatus wherein a hashed address for accessing a hash memory is generated by reversible operation of data obtained by selecting partly a bit string of identification data, and thereby all address spaces of the hash memory can be accessed even when the identification data resemble to each other, and an occurrence of hashed address conflict is suppressed, and thereby the processing efficiency is improved.

Another object of the present invention is to provide a data retrieving apparatus wherein a packet having come into hashed address conflict is stored in an associative memory unit, and when a packet is inputted, judgment is made on match/mismatch between the identification data of the inputted packet and the identification data stored in the hash memory and the associative memory unit, and output of the hash memory or the associative memory unit is selected in response to the result of the judgment, and thereby high-speed processing can be performed irrespective of an occurrence of hashed address conflict.

The above and further objects and features of the invention will more fully be apparent from the following detailed description with accompanying drawings.

BRIEF DESCRIPTION OF THE DRAWINGS

FIG. 11 is a view showing truth values of a write cycle.

DESCRIPTION OF THE PREFERRED EMBODIMENTS

Hereinafter, description is made on the present invention based on drawings showing embodiments.

Figure 1:
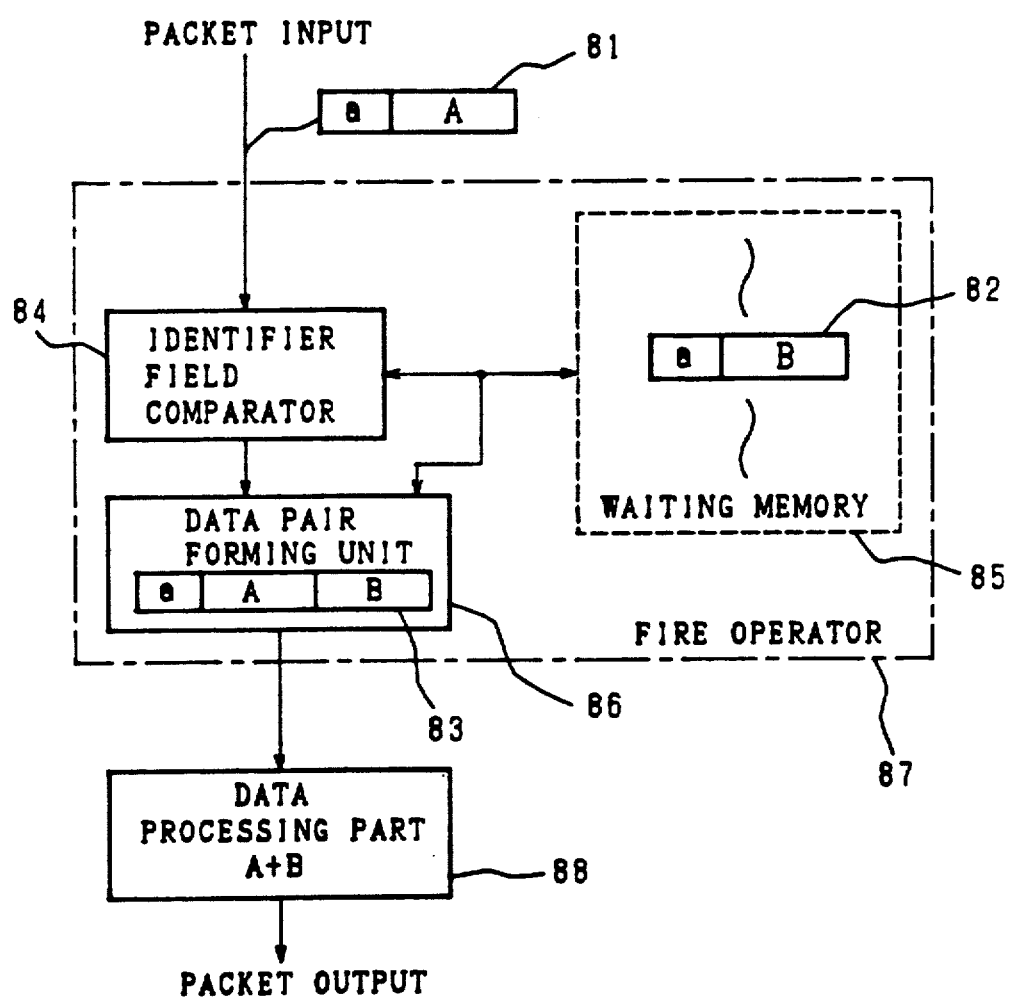
FIG. 1 is a conceptual view of conventional data-driven processor.
Figure 2:
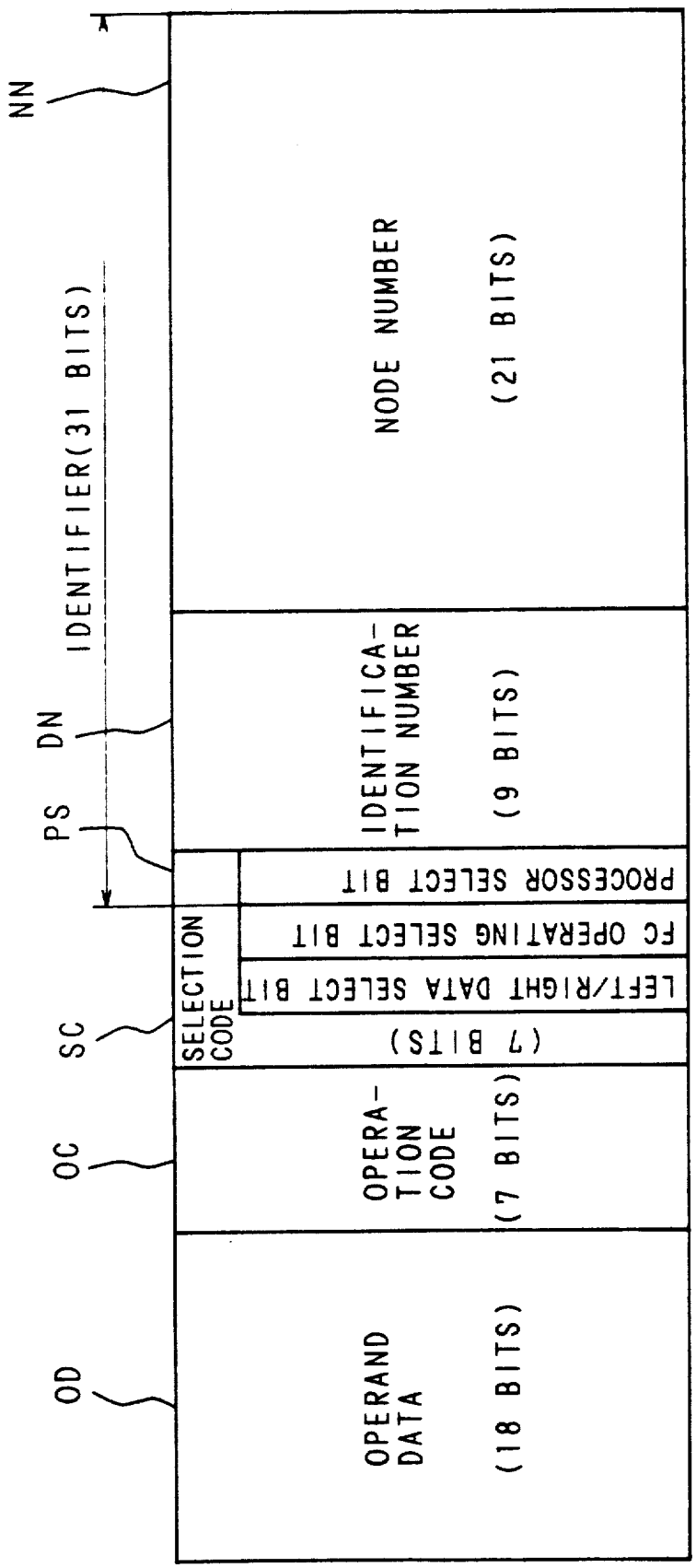
FIG. 2 is a view showing one example of an inputted packet.
Figure 3:
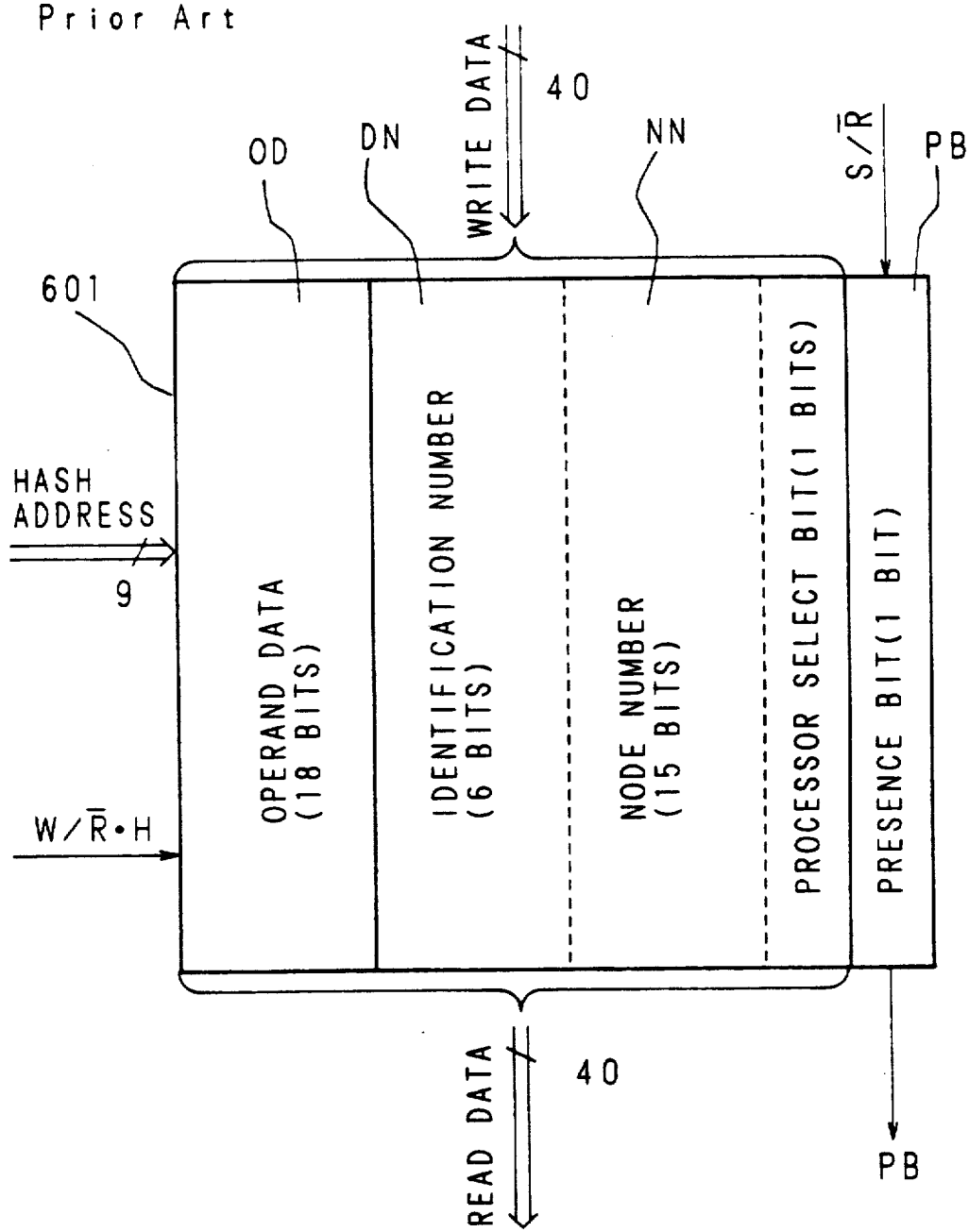
FIG. 3 is a block diagram showing a configuration of a conventional hash memory.
Figure 4:
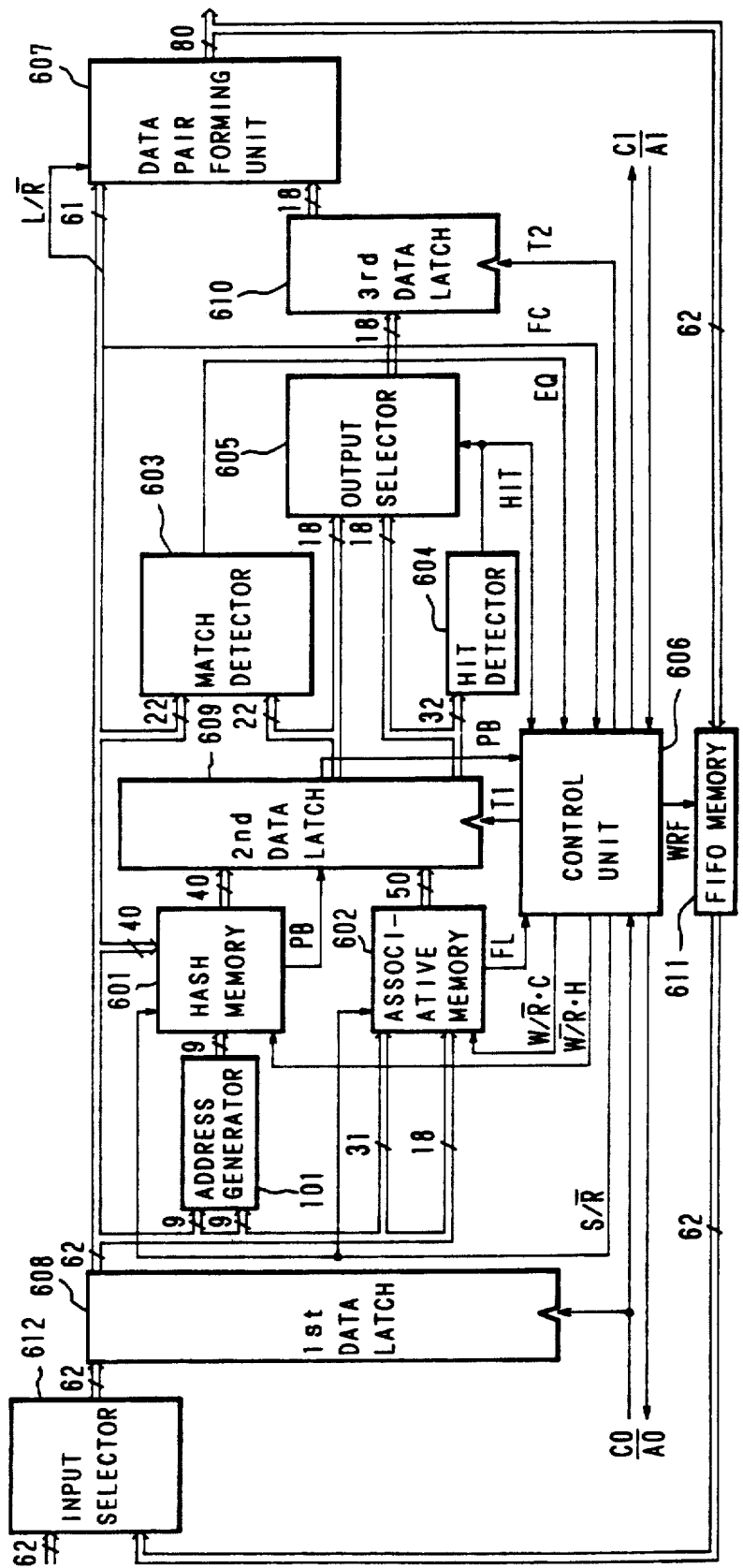
FIG. 4 is a block diagram showing a configuration in the case of applying a data retrieving apparatus in accordance with the present invention to a fire processing apparatus for a data-driven processor.

FIG. 4 is a block diagram showing a configuration in the case of applying a data retrieving apparatus in accordance with the present invention to a fire processing unit for a data-driven processor. In FIG. 4, numeral 612 designates an input selector, which selects a packet outputted from an FIFO memory 611 as described later and an inputted packet. In addition, the packet has a bit map of 62 bits in width as shown in FIG. 2. The selected packet is given to a first data latch 608, where a data input signal CO is latched at a timing of "H". For the latched packet, among 31 bits of the identifier thereof, nine bits of a color/generation identification number DN and lowest nine bits of a node number NN execute exclusive-or operation, and are given respectively to two input terminals of an address generator 101 being an address generating means for generating the hashed address.

Figure 5:
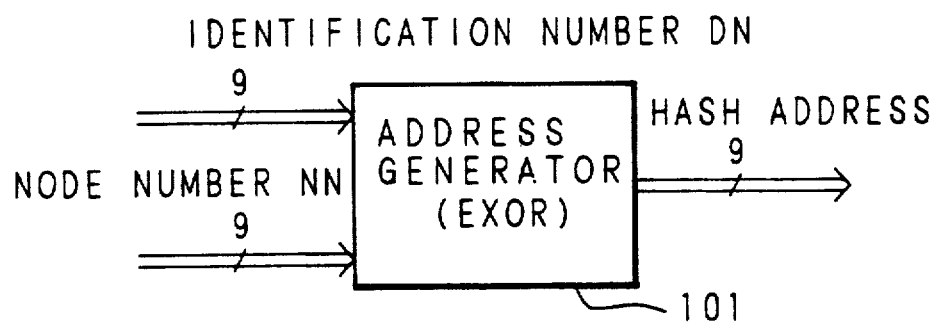
FIG. 5 is a view showing a configuration of an address generator.

FIG. 5 is a view showing a configuration of the address generator 101, and nine bits of the inputted color/generation identification number DN and lowest nine bits of the inputted node number NN are executed exclusive-or operation on every bit, and the result of the operation becomes a hashed address, being given to a hash memory 601 as first storing means.

Also, a 31-bit identifier and an 18-bit operand data OD are given to an associative memory unit 602 as second storing means. Also, write-in data of 40 bits, a combination of 22 bits of the indentifier excluding lowest nine bits of the node number NN and 18 bits of the operand data OD, is given to the hash memory 601.

Figure 6:
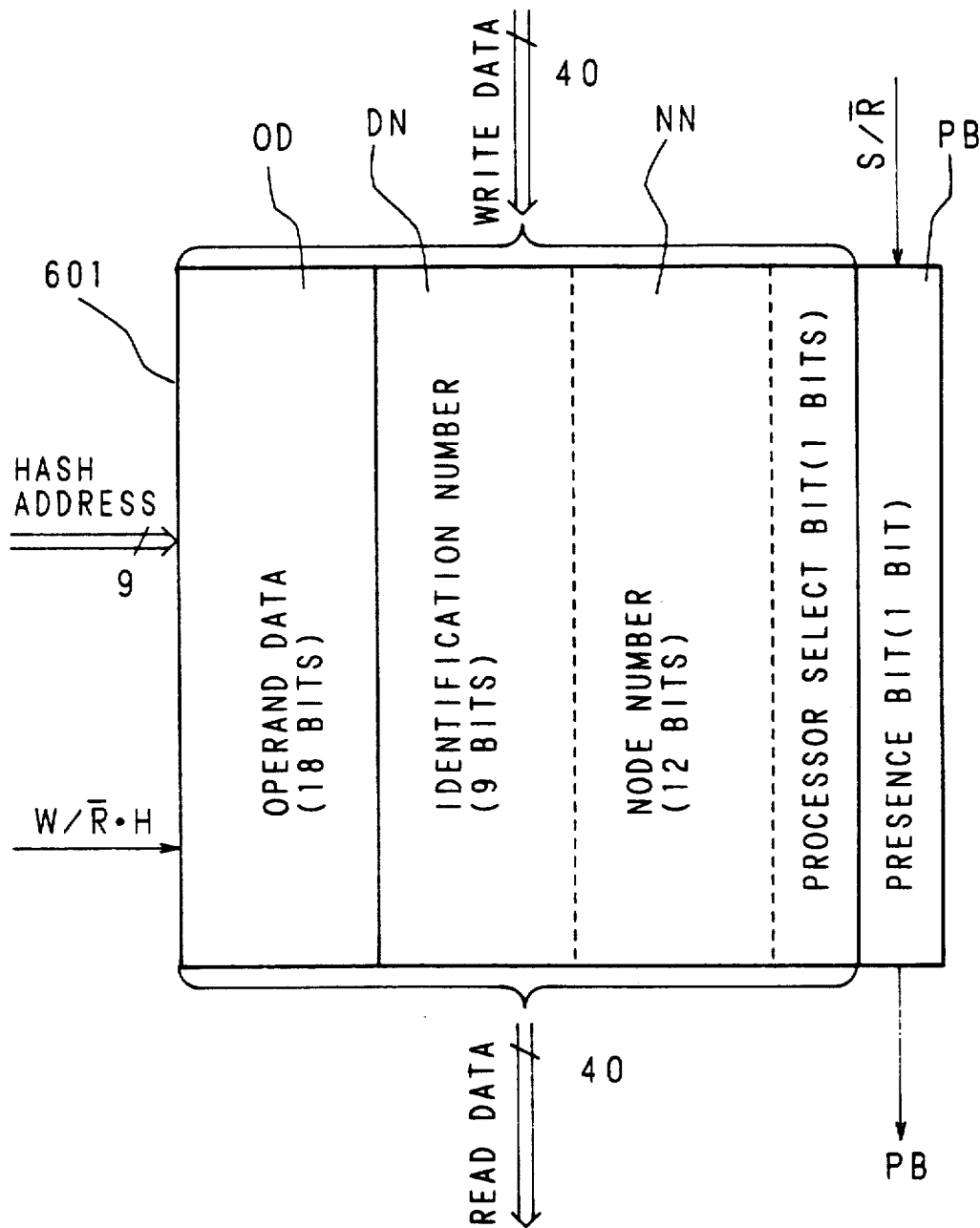
FIG. 6 is a block diagram showing a configuration of a hash memory.

FIG. 6 is a block diagram showing a configuration of the hash memory 601, and the hash memory 601 has a bit width of 41 bits and $2^9 (=512)$ address spaces. Then, 18 bits of the operand data OD and 22 bits out of 31 bits of the identifier excluding lowest nine bits of the node number NN are stored, and a presence bit PB which is a flag showing "valid" (PB=1) or "invalid" (PB=0) of the content of that address is stored. To the hash memory 601, as described above, nine bits of hashed address and 40 bits of write-in data are given, and a read/write signal W/R·H determining a read/write cycle thereof and a set signal S/R performing renewal of the presence bit PB are given from a control unit 606 as described later, and write-in is executed in a cycle of the read-/write signal W/R̄·H="H", and the read out data of the specified address and the presence bit PB are outputted in a cycle of W/R̄·H="L".

Figure 7:
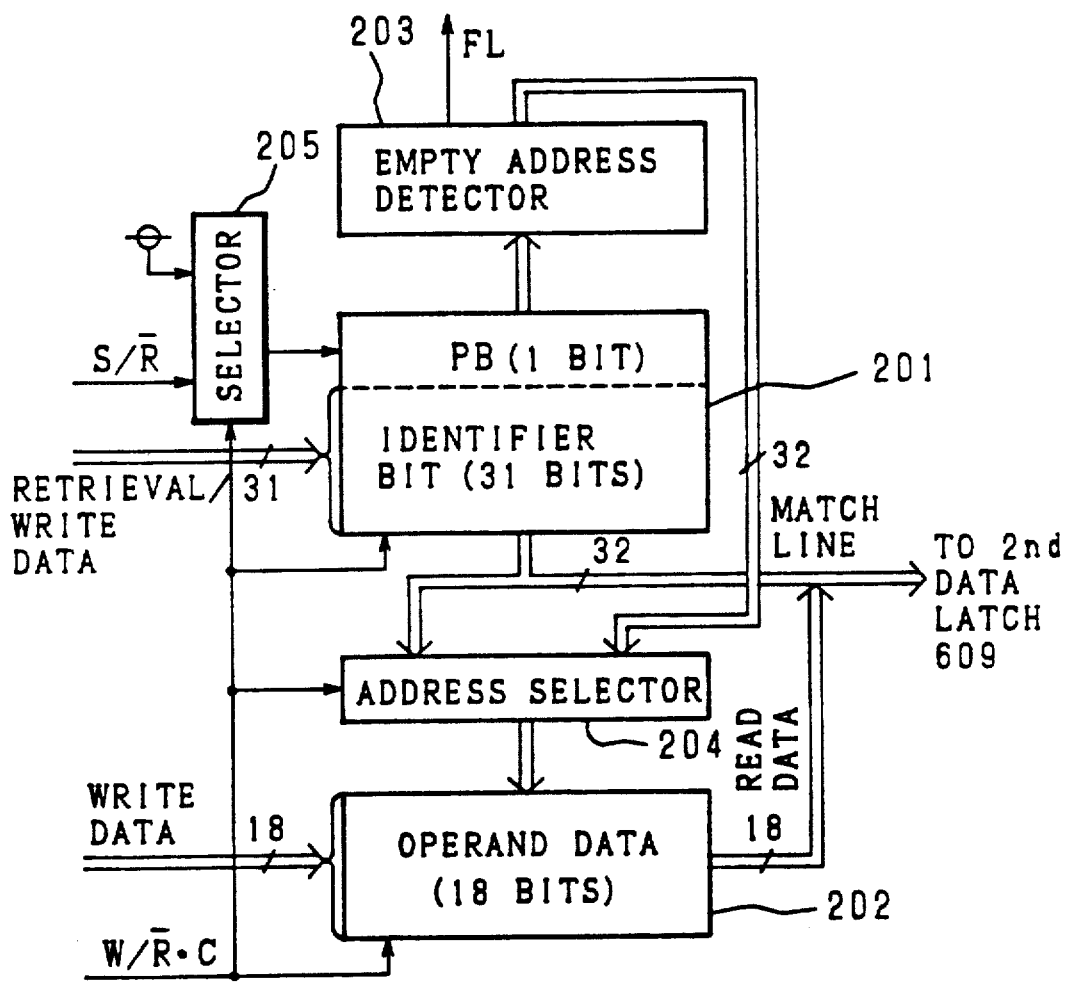
FIG. 7 is a block diagram showing a configuration of an associative memory unit.

FIG. 7 is a block diagram showing a configuration of the associative memory unit 602. In FIG. 7, numeral 201 designates a content-addressed memory (hereinafter referred to as CAM) for retrieving data matching with the 31-bit identifier from the data latch 608 when a hashed address conflict has occurred, and has a capacity of 32 bits × 32 addresses. One bit out of the CAM 201 is used for storing the presence bit PB for judging validity of the stored data as in the case of the above-mentioned hash memory 601. In the CAM 201, a match/mismatch retrieval line (hereinafter referred to as match line) is installed for each address, and a judge signal is outputted such that one bit of 32-bit match line of the address where the given 31-bit identifier and the identifier stored in the CAM 201 perfectly match with each other becomes "H". Also, to the CAM 201, the set signal S/R̄ performing renewal of the presence bit PB is given through a selector 205, and the read/write signal W/R̄·C determining a cycle of read/write is given. The selector 205 is given a reference voltage at one end thereof and the set signal S/R̄ at the other end thereof, and the read/write signal W/R̄·C is given to the switching terminal, and the reference voltage is selected in the case of the read cycle, and the set signal S/R̄ is selected in the case of the write cycle. This means that in the case of the read cycle (W/R̄·C=L), only the address of the presence bit PB=1 is required to the retrieved, and thus it is required that the bit equivalent to the presence bit PB of retrieval data is set at 1 all the time, and the presence bit PB is renewed only in the case of the write cycle (W/R̄·C=H), and therefore this selector 205 is used.

Also, a judge signal showing match or mismatch of the identifiers is outputted from the CAM 201 to the 32-bit match line, and the presence bit PB of each address is outputted to an empty address detector 203, where an empty address is detected by the presence bit PB.

The empty address dectector 203 outputs a 32-bit detection signal to one end of an address selector 204, and when no empty address exists and the identifiers of the packets having come into hashed address conflict are stored in all address spaces of the CAM 201, it outputs a full signal showing this state to a control unit 606. In addition, the detection signal is a 32-bit output corresponding to the address of the CAM 201, and the bit of that empty address is at "H" level. A judge signal from the match line is given to the other end of the address selector 204, and in response to read or write of the read/write signal W/R̄·C given to the switching terminal thereof, the address selector 204 selects the judge signal in the case of the read cycle and selects the detection signal of the empty address detector 203 in the case of the write cycle, respectively. The address select output of the address selector 204 is given to a RAM 202, and the address specified by it is accessed. The RAM 202 is for storing operand data, and has a capacity of 18 bits × 32 addresses. Read/write of the operand data is performed in response to the read/write signal W/R̄·C and the address select output. This means that in the read cycle, the judge signal is given to the address line of the RAM 202, and where an identifier matching with the identifier of the packet inputted to the CAM 201 is stored in the CAM 201 (this is called that the CAM 201 has hit), the 18-bit operand data of the address responding to the judge signal is outputted as a read out data. This read out data is merged with the judge signal, and is outputted to a second data latch 609 as a 50-bit output signal. Also, if the CAM 201 does not hit, 32 bits of the judge signal are all set intact at "L", and any operand data is not read out from the RAM 202.

On the other hand, in the write cycle, the detection signal is selected from the empty address detector 203, and in which address of the CAM 201 and the RAM 202 the 31-bit identifier and the 18-bit operand data OD are to be stored is directed.

Also, where the CAM 201 has hit, renewal of the presence bit PB is required, and therefore the address given to the CAM 201 in the write cycle is a hit address.

The stored data of 40 bits in the hash memory 601 wherein the inputted packet and the hashed address are equal, the presence bit PB of the hash memory 601 and the output signal of the associative memory unit 602 are latched by the second data latch 609 at a timing of a clock $T_1$, and, the presence bit PB is given to the control unit 606, the 22-bit identifier among the stored data is given to one end of a match detector 603, and the 18-bit operand data OD among the stored data is given to one end of an output selector 605, respectively. Also, out of the output signals of the associative memory unit 602, the 32-bit judge signal is given to a hit detector 604, and the 18-bit operand data OD is given to the other end of the output selector 605.

To the other end of the match detector 603, the 22-bit identifier excluding lowest nine bits of the 31-bit identifier of the inputted packet is given, and match of the two inputted identifiers is detected, and when they match, a match signal EQ is outputted to the control unit 606. This means that when they match, the nine-bit identifier used as the hashed address and the 22-bit identifier all match, and therefore this is informed to the control unit 606 as the match signal EQ.

Also, the hit detector 604 monitors 32 match lines from the CAM 201, and when even a bit among them has risen to "H" (=when the CAM 201 hits), it gives a hit signal HIT to the control unit 606 and the switching terminal of the output selector 605.

The output selector 605 selects the operand data OD from one of two types of memories (i.e. the hash memory or the associative memory) storing the matched identifier, when the corresponding data to be fired is retrieved wherein the identifier of the inputted packet and the identifier stored in the hash memory 601 or the associative memory unit 602 completely match.

The operand data OD as the result of selection is given to a third data latch 610, and is latched at a timing of "H" of a clock $T_2$ from the control unit 606, being given to one end of a data pair forming unit 607.

Selection of the output selector 605 is performed by the hit signal HIT given to the switching terminal, and the operand data OD stored in the associative memory unit 602 is selected only when the CAM 201 has hit, and when it has not hit, the data stored in the hash memory 601 is selected, being sent to the third data latch 610.

The operand data OD selected by the output selector 605 is inputted to one end of the data pair forming unit 607, and 62-bit data of the inputted packet from the first data latch 608 is given to the other end thereof. Then, two operand data of 80 bits wherein two data are merged are formed. At this time, there exist some data wherein the sequential relation of operands is important like a subtract instruction of dyadic operation, and therefore the selected operand data OD and the operand data OD of the inputted packet are required to be arranged correctly as a left or right operand.

Figure 8:
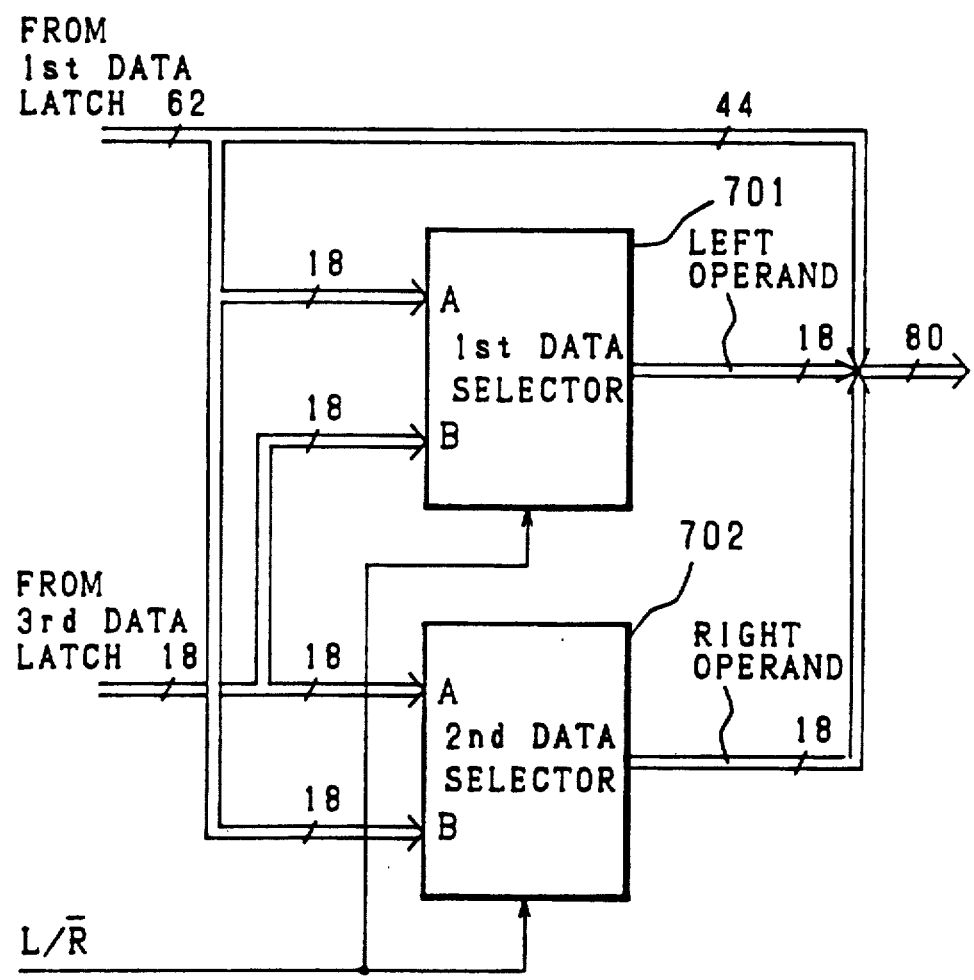
FIG. 8 is a block diagram showing a configuration of a data pair forming unit.

FIG. 8 is a block diagram showing a configuration of the data pair forming unit 607. The data pair forming unit 607 consists of two data selectors 701 and 702, and to the respective switching terminals thereof, a selector control signal L/R̄ is given which shows the selected state by a left/right data select bit of the inputted packet. The operand data OD of the inputted packet from the first data latch 608 is given to the A terminal of the first data selector 701 and the B terminal of the second data selector 702 respectively, and the stored operand data OD from the third data latch 610 is given to the B terminal of the first data selector 701 and the A terminal of the second data selector 702. Then, when the selector control signal L/R̄ from the operand data OD of the inputted packet is "1", the operand data given to the A termials of the respective first and second data selectors 701 and 702 is selected, and when the signal L/R̄ is "0", the operand data given to the B terminals is selected, and the selected output from the first data selector 701 becomes the left operand and the selected output from the second data selector 702 becomes the right operand, and these operands and other data excluding the operand data OD of the inputted packet are merged and outputted.

The control unit 606 is given the presence bit, the hit signal HIT, the match signal EQ, an input select signal FC which is determined by the state of the FC-processing-select-bit showing whether the inputted packet is a two-input instruction or a one-input instruction (two-input instruction FC=1, one-input instruction FC=0) and a full signal FL, and judges these data and outputs the read/write signals W/R̄·C and W/R̄·H, the set signal S/R̄, a data output signal C1 and a write-in signal WRF to the FIFO memory 611 as described later. Also, a data input signal C0 and a data output permit signal A1 are inputted, and the control unit 606 judges these signals and outputs a data input permit signal A0, the clock $T_1$ and the clock $T_2$. Here, the data input signal C0 and the data input permit signal A0 are data transfer control signals between this fire processing apparatus and a processing apparatus giving data to this apparatus (hereinafter referred to as pre-stage apparatus), and the data output signal C1 and the data output permit signal A1 are data transfer control signals between this fire processing apparatus and a processing apparatus receiving data outputted from this apparatus (hereinafter referred to as post-stage apparatus).

When the full signal FL is inputted to the control unit 606, and further, a hashed address conflict has occurred, the write-in signal WRF is given from the control unit 606 to the FIFO memory 611, for example a two-port memory. At this time, the FIFO memory 611 stores 62-bit data of the inputted packet among the output signal from the data pair forming unit 607, buffers it for a predetermined time, and thereafter gives it to the other end of an input selector 612.

Where either of the data in the hash memory 601 of the hashed address having caused hashed address conflict during this time and the data in the CAM 201 is read out and fired, the packet inputted again through the FIFO memory 611 can perform a waiting in either of the hash memory 601 in this apparatus and the associative memory unit 602.

At this time, the input selector 612 is controlled so as to normally select data given from exterior, and only when the buffered data exists at the output end of the FIFO memory 611, it is controlled so as to select alternately the data given from exterior and the data given from the FIFO memory 611.

Figure 9:
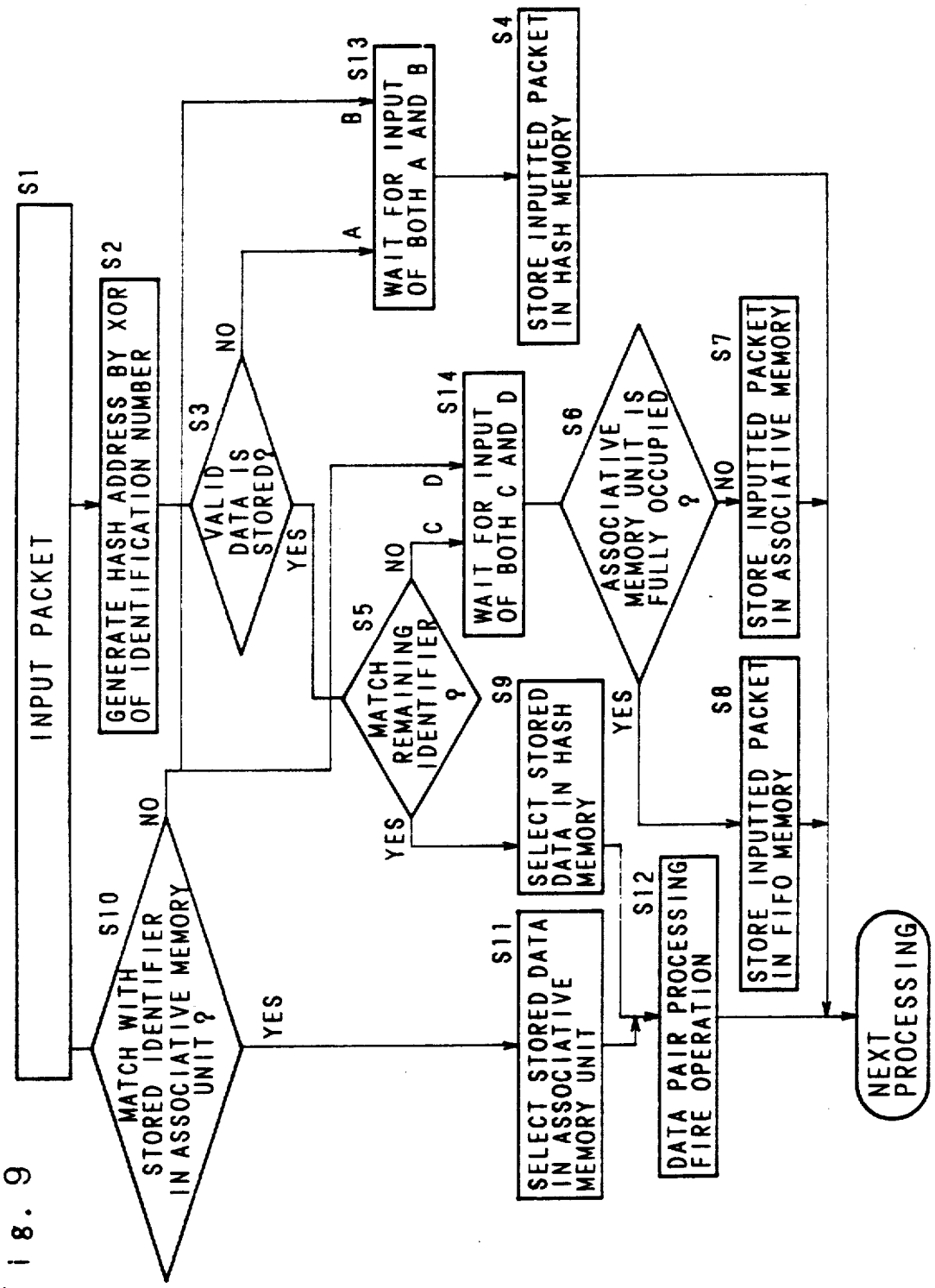
FIG. 9 is a flow chart for explaining an outline of operation of the present invention.

Next, description is made on operation of the fire processing apparatus of the present invention, which is constituted as follows. Here, it is assumed that a plurality of packets waiting for data-pairing are stored in the hash memory 601. FIG. 9 is a flowchart explaining an outline of operation of the present invention. When a packet is inputted (S1), in the associative memory unit 602, match or mismatch with the stored identifier is judged (S10), and a nine-bit hashed address is generated by exclusive-or operation of the color/generation identification number DN (nine bits) and lowest nine bits of the node number NN (S2). Subsequently, judgement is made on whether or not a valid data is already stored in that hashed address of the hash memory 601 (S3), and where the inputted packet does not match with the identifier in the associative memory unit 602 and the data is not stored in Step S3, the inputted packet is stored in the hashed address of the hash memory 601 (S4), and where the data is stored, judgement is made on whether or not remaining identifier of 22 bits matches (S5), and when it does not match, a hashed address conflict has occurred, and therefore the inputted packet is stored in the associative memory unit 602 (S7), and when it matches, the stored data in the hash memory 601 is selected (S9), and fire processing is performed which combines it and the inputted packet into a data pair (S12). However, when the inputted packet does not match with the identifier of the associative memory unit 602, and remaining identifier of 22 bits in the hash memory 601 does not match (S14), judgment is made on whether or not the associative memory unit 602 is fully occupied (S6), and when it is fully occupied, the inputted packet is stored in the FIFO memory 611 (S8), and when it is not fully occupied, the inputted packet is stored in the associative memory unit 602 (S7), and thereafter the next processing is executed.

Also, when the result of judgement of match/mismatch of the inputted packet with the identifier stored in the associative memory unit 602 (S10) is match, the output of the associative memory unit 602 is selected (S11), and is fire-processed (S12).

The above-described is an outline of operation.

Figure 10:
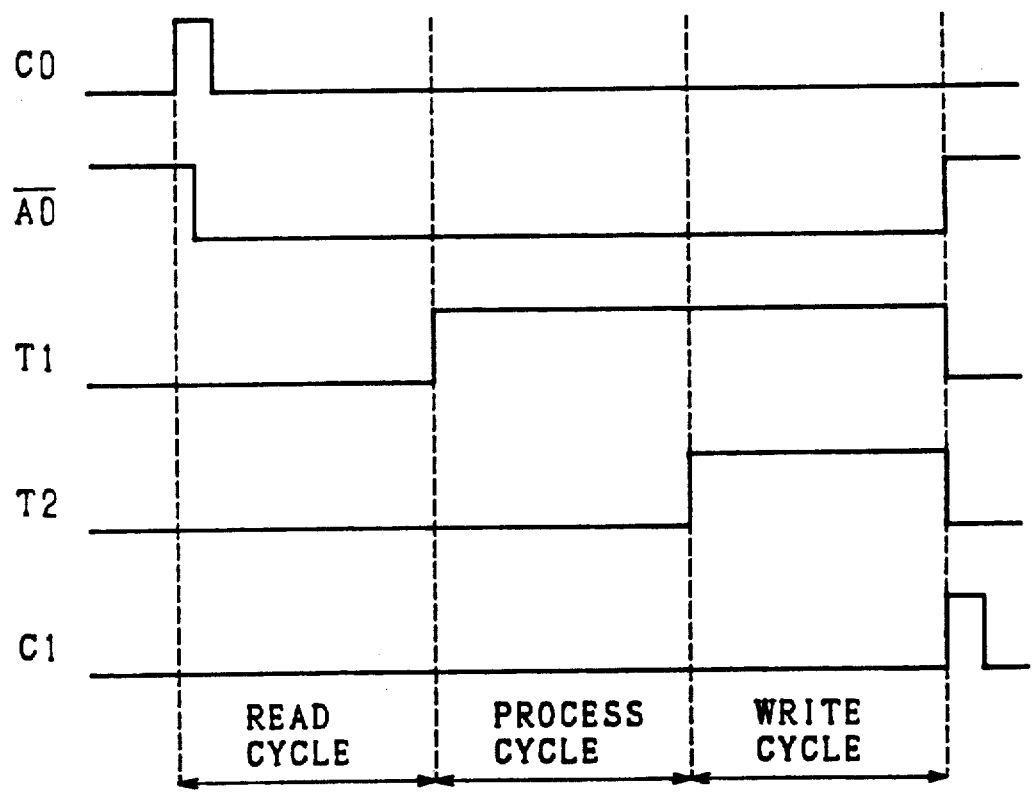
FIG. 10 is an explanatory view of an operation cycle of the present invention.

FIG. 10 is a timing chart explaining an operational cycle of the apparatus of the present invention, and as shown in this chart, the operational cycle of the apparatus of the present invention is divided into three cycles of a read cycle, a process cycle and a write cycle. When the data input signal C0 from the pre-stage apparatus is inputted to the control unit 606, the output permit signal A0 to the prestage apparatus changes from "1" to "0", and the next input is inhibited, and processing proceeds to the read cycle. When processing proceeds to the read cycle, either of the inputted packet selected by the input selector 612 or the packet circulated due to overflow of the CAM 201 is latched in the first data latch 608 at a timing of "0"→"1" of the data input signal C0. When the packet is inputted to the first data latch 608, out of the 31-bit identifier of the above-mentioned packet, nine bits of the color/generation identification number DN and lowest nine bits of the 21-bit node number NN are given to the address generator 101, exclusive-or operation thereof is performed, and a nine-bit hashed address is determined.

In addition, in this embodiment, exclusive-or operation of two kinds of identification codes is performed by the address generator 101, but the number of identification codes to be operated and the content of operation are not limited thereto, and the number to be operated may be three or more, and the content of operation may be another reversible operation such as addition.

In this embodiment, reversible operation means that the hashed address may be generated by the following expression using an operator such that for arbitrary binary numbers a and b, if a $\bigodot$ b=c, b $\bigodot$ c=a holds. $[k_1]_k \bigodot \ldots \bigodot [k_M]_k$ where, $k_1 \ldots k_M$ are identification codes.

When the hashed address is determined, in the read cycle, the hash memory 601 and the associative memory 602 are read out simultaneously. When a time required for reading out the memories has elapsed, the clock $T_1$ changes from "0" to "1", and the read out data is latched in the second data latch 609. From here, program enters the process cycle, and the match detector 603 and the hit detector 604 output the match signal EQ and the hit signal HIT based on each data read out from the hash memory 601 and the associative memory unit 602. This means that the match detector 603 detects whether or not a hashed address conflict has occurred, and takes a comparison between the identifier of the packet inputted to the first data latch 608 and the identifier latched in the second data latch 609 which has been read out from the hash memory 601. This means that a total of 22 bits consisting of nine bits of the color/generation identifier number DN, highest 12 bits of the node number NN and one bit of the processor identification bit are compared. When it is judged that these 22 bits are all equal, the nine-bit hashed address is equal, and the nine-bit color/generation identification number DN is equal, and therefore lowest nine bits of the node number NN are equal, and thus it is judged that the 31-bit identifier is fully equal, and the match detector 603 outputs the match signal EQ="1" to the control unit 606.

This means that taking nine bits of the color/generation identification number DN of the inputted packet as g, highest 12 bits of the node number NN thereof as $N_A$, and lowest nine bits thereof as $N_B$, and taking the color/generation identification number DN stored in the hash memory 601 as $g_M$, highest 12 bits of the node number NN thereof as $N_M$, as described above, a hashed address A is evaluated by the following expressions.

$$A = g \oplus N \quad (1)$$

$\oplus$: Exclusive-or operation
Or, $$N_B = g \oplus A \quad (2)$$

The hash memory 601 is accessed by this hashed address A. Lowest nine bits among 21 bits of the node number NN are not stored in the hash memory 601, and therefore a comparison with lowest nine bits $N_B$ of the inputted packet cannot be taken unless they are obtained.

However, as described above, if $g = g_M$ is found, the following equation is obtained from the above-mentioned expression (2).

$$N_B = g_M \oplus A \quad (3)$$

However, since $N_B$ is obtained directly, it is not required to obtain lowest nine bits not stored, and no comparison is required.

Then, in the hit detector 604, when the identifier stored in the associative memory unit 602 and the identifier of the packet inputted to the first data latch 608 are equal to each other, that is, any bit of the 32-bit match line becomes "H", the hit signal HIT="1" is outputted.

When a time required for the above-described operation has elapsed, the clock $T_2$ changes from "0" to "1", and the write cycle starts. In the write cycle, writing into the memory including renewal of the presence bit PB and generation of a data pair are performed. When a time required for these operations has elapsed, the control unit 606 outputs the data output signal C1, initializes the clocks $T_1$ and $T_2$ and the data input permit signal A0, and terminates a series of processings. Note that the data output signal C1 is outputted only when the inputted packet has fired, and when it has not fired, only the clocks $T_1$ and $T_2$ and the data input permit signal A0 are initialized, and the data output signal C1 is not outputted. Then, in this write cycle, the read/write signals W/$\overline{R}$·H and W/$\overline{R}$·C, the write-in signal WRF to the FIFO memory 611, and the set signal S/$\overline{R}$ are generated in the control unit 606 by the presence bit PB, the match signal EQ, the hit signal HIT, the full signal FL and the input select signal FC.

FIG. 11 shows a truth value table for this. Whether or not the inputted packet is to be written into the hash memory 601 and the associative memory unit 602 is determined according to this table, and operation is performed as follows.

Item (1) of FIG. 11 shows the case where a one-input instruction is given, and a one-operand data is outputted intact without renewing any content of the hash memory 601.

Items (2) through (7) show the cases where a two-input instruction is given, and whether or not a data is to be outputted is determined by various conditions. Item (2) shows the case where a data is stored in the hashed address determined by the inputted packet of the hash memory 601 (PB=1), and it has not caused a hashed address conflict (EQ=1). No data is stored in a duplicate fashion in the hash memory 601 and the associative memory unit 602, and therefore the CAM 201 never hits (HIT=0) in this case.

At this time, in the write cycle, it is necessary to reset the presence bit PB of the hash memory 601, and therefore the read/write signal W/$\overline{R}$·H is set at "1", and the set signal S/$\overline{R}$ at "0". The associative memory unit 602 is not required to be modified and therefore the read/write signal W/$\overline{R}$·C is set at "0". The inputted packet has fired with the content of the hash memory 601, and therefore the data output signal C1 is outputted simultaneously with completing the write cycle.

Items (3) and (4) of FIG. 11 show the cases where valid data has been stored in the hash memory 601, but it has caused a hashed address conflict (PB=1, EQ=0). Then, in Item (3), the inputted data has not hit also in the CAM 201 (HIT=0), and therefore the inputted data is stored in the associative memory unit 602 (W/$\overline{R}$·C=1, S/$\overline{R}$=1), and no data is outputted (C1=0). In Item (4), the CAM 201 has hit (HIT=1), and in result, the inputted packet fires with the content of the associative memory unit 602, and is outputted (C1=1). Here, the presence bit PB of the CAM 201 must be reset, and therefore the read/write signal W/R·C is set at "1" and the set signal S/R at "0". Items (5) and (6) show the cases where valid data has not been stored in the hash memory 601 (PB=0), and the value of the match signal EQ is insignificant. Item (5) shows the case where the CAM 201 has not hit (HIT=0), and the inputted packet is written into the hash memory 601 (W/R·H=1, S/R=1, C1=0). In Item (6), the CAM 201 has hit, and operation like Item (4) is performed. Also, Item (7) shows the case where valid data has been stored in the hash memory 601, and it has caused a hashed address conflict (PB=1, EQ=0), and is required to be stored in the associative memory unit 602, but the CAM is fully occupied, and all addresses become valid (FL=1), and the inputted packet is buffered in the FIFO memory 611 for a predetermined time (WRF=1). The operations described in reference to FIG. 11 are all performed in the write cycle, and in operations other than those in the write cycle, the read/write signal W/R·H and W/R·C are set at "0" all the time.

The packet and the data which have proved to fire by these operations are sent to the data pair forming unit 607, and an operand pair packet is formed and outputted. Thus, the hash memory 601 and the associative memory 602 are used together for the fire processing apparatus, and the both are read out simultaneously, and thereby processing can be performed at the same speed independent of the hashed address conflict, and the apparatus can be controlled simply as shown in FIG. 11.

Here, description is made on one example wherein, when the hashed address is generated by exclusive-or operation, even if the color/generation identification number DN which is the first identification data is the same or lowest three bits thereof are the same, the value of hashed address to be generated extends to a wide range.

Table 1 shows a comparison taken between the hashed addresses generated in the present invention and the prior art, and all numerals in the Table are shown by hexadecimal notation. In the case of the prior art, since lowest three bits of the color/generation identification numbers DN are 0 and equal even if those numbers DN differ ($0_H = 000000000$, $8_H = 000001000$, $80_H = 010000000$), the generated hashed addresses are only four addresses of No. 0–No. 3 addresses, but in the present invention, it is found that the generated hashed addresses extends to a wide range. Therefore, in the present invention, different hashed addresses are generated even if some of the identification data are the same or close to each other, and thereby frequency of hashed address conflicts is reduced.

TABLE 1

| 9 bits of DN (Hex) | Normal | | | | Bit Reverse | | | |
|---|---|---|---|---|---|---|---|---|
| | lowest 9 bits of NN (Hex) | | | | | | | |
| | 0 | 1 | 2 | 3 | 0 | 1 | 2 | 3 |
| 0 | 0 | 1 | 2 | 3 | 0 | 1 | 2 | 3 |
| 8 | 0 | 1 | 2 | 3 | 8 | 9 | 10 | 11 |
| 80 | 0 | 1 | 2 | 3 | 80 | 81 | 82 | 83 |

In addition, in this embodiment, in determining the hashed address, the hashed address is generated by exclusive-or operation of nine bits of the color/generation identification number DN of the identifier and lowest nine bits of the node number NN thereof, but a similar effect can be obtained also in a manner that the positions of lowest nine bits of the node number NN are bit-reversed (highest bits and lowest bits are replaced), and exclusive-or operation is performed to generated the hashed address.

Detailed description is made on an effect when this bit-reverse is used. In the fire processing apparatus, the color/generation identification numbers DN often flow in serial numbers. For example, the packet having the color/generation identification number $DN=2_H$ and lowest nine bits of the node number $NN=1_H$ is inputted after the packet having the color/generation identification number $DN=1_H$ and lowest nine bits of the node number $NN=2_H$. In this case, the results of these exclusive-or operations are equal and the hashed addresses of the both packets are equal but the identifiers thereof do not match, and therefore a hashed address conflict occurs.

However, when lowest nine bits of the node number NN is bit-reversed, and the hashed address is obtained by exclusive-or operation, the hashed address of the former packet becomes $81_H$, and the hashed address of the latter packet becomes $102_H$, and thus the hashed addresses quite different from each other can be generated. Table 2 shows one example of generation of the hashed address in the case of the above-mentioned bit-reverse.

TABLE 2

| 9 bits of DN (Hex) | Normal | | | Bit Reverse | | |
|---|---|---|---|---|---|---|
| | lowest 9 bits of NN (Hex) | | | | | |
| | 1 | 2 | 3 | 1 | 2 | 3 |
| 0 | 1 | 2 | 3 | 100 | 80 | 180 |
| 1 | 0 | 3 | 2 | 101 | 81 | 181 |
| 2 | 3 | 0 | 1 | 102 | 82 | 182 |

In comparison with the case where no bit-reverse is performed, the hashed address can be generated in further more patterns in the case of bit-reverse.

Also, in this embodiment, even when the hashed address conflict frequently occurs and the CAM overflows, the inputted packet can be buffered in the FIFO memory for a predetermined time, and therefore the capacity of the CAM can be made smaller, and no special processing is required to be performed at an overflow, and the processing speed is improved.

In addition, in this embodiment, description is made on the case where the data retrieving apparatus of the present invention is applied to the fire processing apparatus of the data-driven processor, but, needless to say, this invention is not limited to this case, and can be applied to general matching memories performing data retrieval by an identifier such as a key word.

As described above, in accordance with the present invention, generation of the hashed address is performed by a predetermined reversible logical or arithmetic operation (for example exclusive-or, addition etc.), and therefore the generated hashed address has a wide area, even if a plurality of identification data have equal or similar values so that the whole area of the address spaces is effectively utilized and the frequency of hashed address conflicts is reduced. Also, by installing the associative memory unit, the packet having come into a hashed address conflict can be stored therein, and circulation of the packet can be dispensed with, and thereby the processing speed is improved by a simultaneous retrieval of the hash memory and the associative memory unit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data retrieving apparatus which processes an input packet included in a set of received input packets, each of said received input packets having a plurality of identification data of an arbitrary bit length, with the identification data in each said input packet including at least two bit strings which have differing values in each of said received input packets, comprising:

address generating means for selecting the two bit strings from said identification data of said input packet, and generating a storing address of said input packet by a reversible operation on the selected bit strings;

a hash memory means for holding parts or all of a plurality of data packets, said hash memory means having addresses corresponding to the storing addresses generated by the address generating means;

first storing means for storing a part or all of said input packet in the hash memory means at said storing address; and comparing means for comparing a part or all of the identification data of a stored packet previously stored at the storing address with a part or all of the identification data of the input packet, and for determining the equivalence of said compared data, when a valid packet is already stored in said storing address reserved for the input packet.

2. A data retrieving apparatus as set forth in claim 1, wherein said address generating means generates said storing address by an exclusive-or operation on the selected bit strings.

3. A data retrieving apparatus as set forth in claim 1, wherein said address generating means generates said storing address by an add operation on the selected bit strings.

4. A data retrieving apparatus as set forth in claim 1, wherein said address generating means generates said storing address by a bit-reverse operation on one of the selected bit strings and a reversible operation operation on the selected bit strings.

5. A data retrieving apparatus as set forth in claim 1, wherein said identification data has a processor select bit, an identification number, and a node number showing a location of a primitive where an operation is to be executed.

6. A data retrieving apparatus as set forth in claim 5, wherein said address generating means derives a first bit string from said identification number and a second bit string from said node number, and generates said storing address by a reversible operation on the first bit string and the second bit string.

7. A data retrieving apparatus as set forth in claim 6, wherein said address generating means generates said storing address by a bit-by-bit exclusive-or operation on the first bit string and the second bit string.

8. A data retrieving apparatus as set forth in claim 6, wherein said address generating means generates said storing address by an arithmetic add operation on the first bit string and the second bit string.

9. A data retrieving apparatus as set forth in claim 5, wherein said first storing means stores into each address data comprising:

operand data to be operated upon: and index data comprising said identification number, a sub string of said node number which had not been derived for generating a hashed address and the processor select bit.

10. A data retrieving apparatus as set forth in claim 9, wherein said comparing means compares said index data of the stored packet stored in said first storing means with the corresponding sub string of the input packet.

11. A data retrieving apparatus as set forth in claim 1, further comprising:

(1) an associative memory means comprising:

(a) a writing means for writing a part or all of the input packet and registering the identification data of said input packet as retrieval data, when said comparing means finds a mismatch between the input packet and the stored packet; and (b) a reading means for judging the identification data of the input packet and for reading out the stored packet whose identification data matches with said identification data of the input packet from among the packets already stored in the associative memory means, when a packet is input; and (2) controlling means for reading out the hash memory means and for reading out the associative memory means in response to data contained in the input packet, for writing data from the input packet to the hash memory means or the associative memory means, when no packet whose identification data matches the identification data of the input packet is stored in the associative memory means or the hash memory means, and for outputting selectively outputs of either the hash memory means or the associative memory means based on the result of a comparison done by the comparing means between the identification data of the input packet and packets stored in either the associative memory means or the hash memory means.

12. A data retrieving apparatus as set forth in claim 1, wherein said address generating means selects more than two bit strings form said identification data.

13. A data retrieving apparatus which processes an input packet, included in a set of received input packets, each, of said received input packets having a plurality of identification data of an arbitrary bit length, with the identification data in each said input packet including at least two bit strings which have differing values in each of said received input packets, comprising:

address generating means for selecting partly the two bit strings from said identification data of said input packet, and generating a storing address of said input packet by a reversible operation of the selected bit strings;

a hash memory means for holding parts or all of a plurality of data packets, such hash memory means having addresses corresponding to the storing addresses generated by the address generating means;

first storing means for storing a part or all of said input packet in the hash memory at said storing address;

comparing means for comparing a part or all of the identification data of a stored packet previously stored at the storing address with a part or all of the identification data of the input packet, and for determining the equivalence of said compared data, when a valid packet is already stored in said storing address reserved for the input packet;

second storing means for storing a part or all of said input packet regarding the identification data of the input packet as a retrieval data, when said comparing means judges said two identification data to be mismatched;

judging means for judging a match of the identification data of the input packet with the identification data of packets already stored in said second storing means, when a packet is input; and selecting means for selecting an output from said first storing means or said second storing means in response to the result of the judgment of said judging means.

14. A data retrieving apparatus as set forth in claim 13, wherein said second storing means comprises a CAM (content-addressed memory) storing said identification data and a presence bit showing the validity of the stored data and a RAM storing said operand data to be operated upon.

15. A data retrieving apparatus as set forth in claim 13, wherein said judging means judges the identification data of the input packet and the identification data stored in said second storing means on every bit.

16. A data retrieving apparatus as set forth in claim 13, further comprising a FIFO memory for storing the input packet, when said judging means detects a mismatch and said presence bits stored in said CAM are all valid.

* * * * *